(12) United States Patent
Nicholson et al.

(10) Patent No.: US 9,131,365 B2
(45) Date of Patent: Sep. 8, 2015

(54) METHODS, APPARATUSES AND COMPUTER PROGRAM PRODUCTS FOR SECURING COMMUNICATIONS

(71) Applicant: Syniverse Technologies, LLC, Tampa, FL (US)

(72) Inventors: Christopher Nicholson, Seffner, FL (US); Kenneth W. Hammer, Lutz, FL (US)

(73) Assignee: SYNIVERSE TECHNOLOGIES, LLC, Tampa, FL (US)

( * ) Notice: Subject to any disclaimer, the term of this patent is extended or adjusted under 35 U.S.C. 154(b) by 424 days.

(21) Appl. No.: 13/747,018

(22) Filed: Jan. 22, 2013

(65) Prior Publication Data
US 2014/0162619 A1 Jun. 12, 2014

Related U.S. Application Data

(60) Provisional application No. 61/736,338, filed on Dec. 12, 2012.

(51) Int. Cl.
*H04W 8/24* (2009.01)
(52) U.S. Cl.
CPC ..................................... *H04W 8/245* (2013.01)
(58) Field of Classification Search
CPC ... H04W 84/005; H04W 4/046; H04W 16/18; H04W 4/04; H04W 4/027
USPC ........ 455/445, 422.1; 713/153–154, 168–171
See application file for complete search history.

(56) References Cited

U.S. PATENT DOCUMENTS

| | | | |
|---|---|---|---|
| 7,174,018 B1* | 2/2007 | Patil et al. | 380/258 |
| 2006/0059265 A1* | 3/2006 | Keronen | 709/228 |
| 2007/0206571 A1* | 9/2007 | Silver | 370/352 |
| 2008/0056235 A1* | 3/2008 | Albina et al. | 370/352 |
| 2011/0151836 A1* | 6/2011 | Dadu et al. | 455/411 |
| 2012/0115491 A1* | 5/2012 | Nicholson et al. | 455/445 |
| 2013/0308470 A1* | 11/2013 | Bevan et al. | 370/252 |
| 2014/0051422 A1* | 2/2014 | Mittal et al. | 455/419 |

* cited by examiner

*Primary Examiner* — Amir Mehrmanesh
(74) *Attorney, Agent, or Firm* — Alston Bird LLP

(57) ABSTRACT

An apparatus for securing communications includes a processor and memory storing executable computer code causing the apparatus to at least perform operations including receiving a request to activate a service transferring communications of a cellular network to a wireless local network. The computer program code may further cause the apparatus to provide an activation key to a device responsive to an indication that the device is authorized to utilize the service based on determining an identifier(s) of the request is valid. The computer program code may further cause the apparatus to provide a private key to the device, to enable the device to utilize the private key to subsequently register to transfer communications of the cellular network to a wireless local network(s), responsive to receiving a message for the private key from the device and a message from the cellular network. Corresponding methods and computer program products are also provided.

21 Claims, 8 Drawing Sheets

METHODS, APPARATUSES AND COMPUTER PROGRAM PRODUCTS FOR SECURING COMMUNICATIONS

CROSS-REFERENCE TO RELATED APPLICATION

This application claims benefit of U.S. Provisional Application No. 61/736,338 filed Dec. 12, 2012, the contents of which are hereby incorporated herein in their entirety by reference.

TECHNOLOGICAL FIELD

Embodiments of the invention relate generally to wireless communication technology and, more particularly relate to an apparatus, method and a computer program product for facilitating secure authorization of transfer of communications from a cellular system to a local network in communications systems.

BACKGROUND

Currently, demand for high-quality mobile voice and messaging capabilities regardless of location continues to grow. However, given the ubiquitous nature of communication devices, many mobile operators may have coverage gaps in areas of their network. For example, there may be gaps in coverage areas in buildings, or basements of homes or the like to name a few. Additionally, many mobile operators may desire to expand their coverage areas for providing communication services to users. However, expanding coverage areas may be costly.

As such, it may be beneficial to provide a mechanism for increasing coverage areas of network operators to accommodate consumer demand and alleviate network bandwidth strains while minimizing costs.

BRIEF SUMMARY

A method, apparatus and computer program product are therefore provided for enabling provision of voice and messaging over a wireless local network(s) that extends coverage into wireless local network areas in a secure manner. An example embodiment may reduce roaming costs for network operators and their subscribers, and may facilitate more efficient usage of a mobile network.

As such, an example embodiment may enable a communication device to utilize a network as normal when the communication device is not within range of the wireless local network (e.g., a wireless local area network (WLAN), a Wireless. Fidelity (Wi-Fi) network). The communication device may automatically switch to a Voice over Internet Protocol (VoIP) (e.g., a Session Initiation Protocol (SIP)) such as, for example, SIP-based calling and messaging in an instance in which the communication device enters a proximity of the wireless local network.

An example embodiment may facilitate authorization of a service to enable the transfer of communications from a cellular network to a wireless local network (e.g., a Wi-Fi access point). For instance, authorization or authentication may be achieved by an example embodiment in an instance in which a cellular operator(s) authenticates a communication device (s) (e.g., mobile station(s)) by sending an encrypted message to a network device (e.g., a WiTT network device). In this regard, the network device of an example embodiment may send a challenge (e.g., a random challenge (e.g., a random number)) to the communication device (e.g., a mobile station) and the communication device may perform a calculation using a secret key (e.g., a private key) and may return a response to the network device. In an instance in which the network device determines that the response is an expected value the network device may authenticate the communication device. In response to authenticating the communication device, the communication device may transfer communications from the cellular network to a detected wireless local network (e.g., a Wi-Fi access point, a WLAN access point, etc.).

In one example embodiment, a method for securing communications is provided. The method may include receiving a request to activate a service to enable transfer of communications provided by a cellular network device to a wireless local network in response to a communication device detecting the wireless local network. The method may further include enabling provision of a temporary activation key to the communication device in response to receiving an indication from a cellular network device denoting that the communication device is authorized to utilize the service based in part on determining that one or more identifiers of the request are valid. The method may further include enabling provision of a private key to the communication device, to enable the communication device to utilize the private key to subsequently register to transfer other communications of the cellular network device to the wireless local network or another wireless local network, in response to receiving a message for the private key from the communication device and receiving a cellular message from the cellular network device. The cellular message was initially received by the cellular network device from the communication device.

In another example embodiment, an apparatus for securing communications is provided. The apparatus may include a processor and memory including computer program code. The memory and the computer program code are configured to, with the processor, cause the apparatus to at least perform operations including receiving a request to activate a service to enable transfer of communications provided by a cellular network device to a wireless local network in response to a communication device detecting the wireless local network. The memory and computer program code are also configured to, with the processor, cause the apparatus to enable provision of a temporary activation key to the communication device in response to receiving an indication from a cellular network device denoting that the communication device is authorized to utilize the service based in part on determining that one or more identifiers of the request are valid. The memory and computer program code are also configured to, with the processor, cause the apparatus to enable provision of a private key to the communication device, to enable the communication device to utilize the private key to subsequently register to transfer other communications of the cellular network device to the wireless local network or another wireless local network, in response to receiving a message for the private key from the communication device and receiving a cellular message from the cellular network device. The cellular message was initially received by the cellular network device from the communication device.

In another example embodiment, a computer program product for securing communications is provided. The computer program product includes at least one computer-readable storage medium having computer-executable program code portions stored therein. The computer-executable program code instructions may include program code instructions configured to cause receipt of a request to activate a service to enable transfer of communications provided by a cellular network device to a wireless local network in response to a communication device detecting the wireless local network. The program code instructions may also be configured to enable provision of a temporary activation key to the communication device in response to receiving an indication from a cellular network device denoting that the communication device is authorized to utilize the service based in part on determining that one or more identifiers of the request are valid. The program code instructions may also be configured to enable provision of a private key to the communication device, to enable the communication device to utilize the private key to subsequently register to transfer other communications of the cellular network device to the wireless local network or another wireless local network, in response to receiving a message for the private key from the communication device and receiving a cellular message from the cellular network device. The cellular message was initially received by the cellular network device from the communication device.

An embodiment of the invention may provide a better user experience since communication device users may utilize voice and messaging over wireless local networks in addition to cellular networks by facilitating reliable coverage in areas where wireless local networks are available in a secure manner.

DETAILED DESCRIPTION

Figure 1:
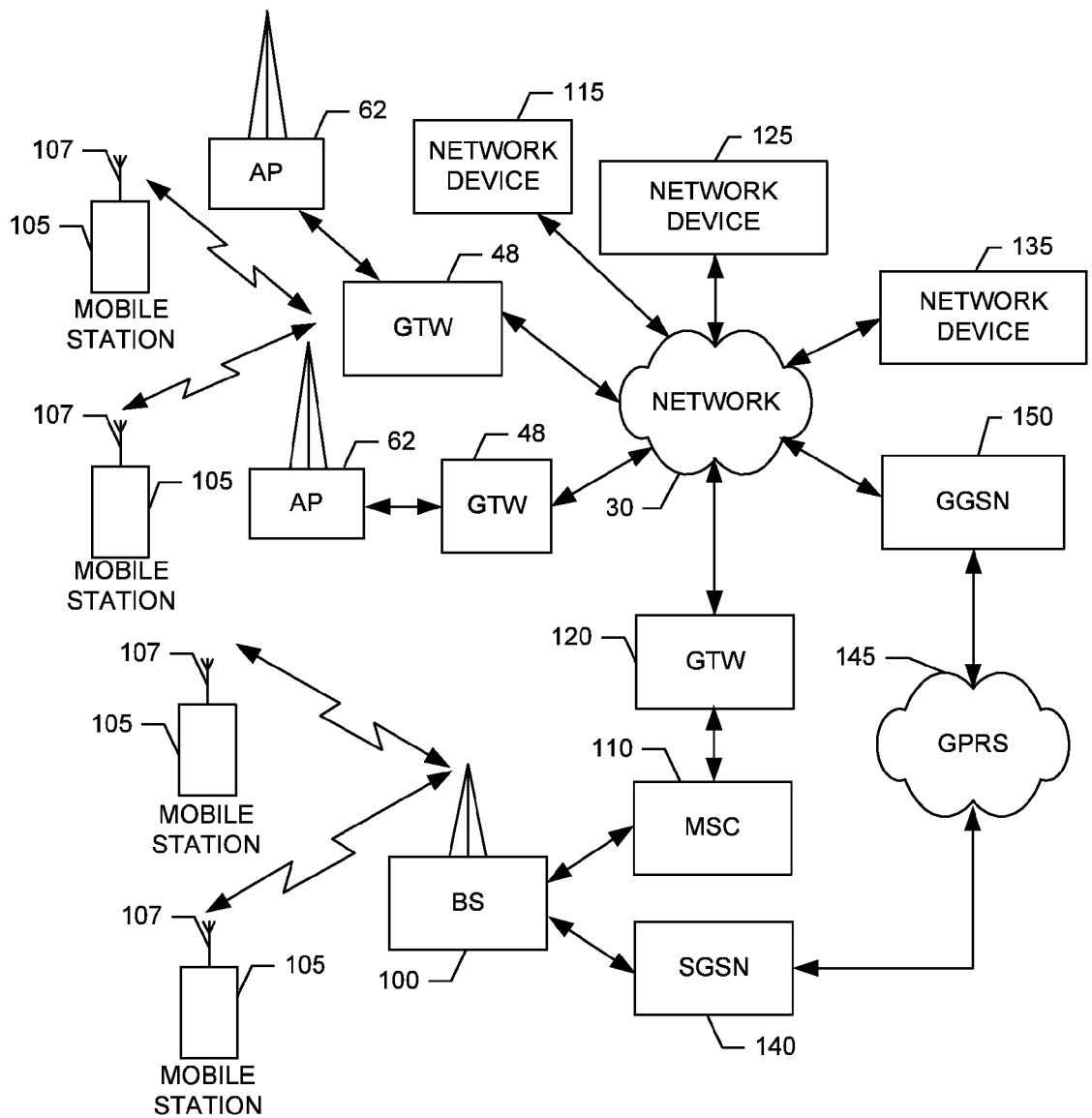
FIG. 1 is a schematic block diagram of a system according to an example embodiment of the invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

I. Exemplary System Architecture

Referring now to FIG. 1, an illustration of a communication system that can be used in conjunction with various example embodiments of the invention is provided. The system includes a plurality of network devices. As shown, one or more mobile stations 105 may each include an antenna 107 for transmitting signals to and for receiving signals from a base site or base station (BS) 100. The base station 100 may be a part of one or more cellular or mobile networks each of which includes elements required to operate the network, such as a mobile switching center (MSC) 110. In operation, the MSC 110 is capable of routing calls to and from the mobile stations 105 when the mobile stations 105 are making and receiving calls. The MSC 110 may also provide a connection to landline trunks when a mobile station(s) 105 is involved in a call. In addition, the MSC 110 is configured to control the forwarding of messages to and from the mobile stations 105, and can also control the forwarding of messages for the mobile stations 105 to and from a messaging center.

The MSC 110 may be coupled to a data network, such as a local area network (LAN), a metropolitan area network (MAN), and/or a wide area network (WAN). The MSC 110 can be directly coupled to the data network. In one example embodiment, however, the MSC 110 may be coupled to a gateway (GTW) 120, and the GTW 120 is coupled to a WAN, such as the network 30 (e.g., the Internet). In turn, devices such as processing elements (e.g., personal computers, server computers or the like) can be coupled to the mobile stations 105 via the network 30 (e.g., the Internet). For example, as explained below, the processing elements can include one or more processing elements associated with a network device 115, a network device 125 and a network device 130.

The BS 100 may also be coupled to a Serving General Packet Radio Service (GPRS) Support Node (SGSN) 140. The SGSN 140 is capable of performing functions similar to the MSC 110 for packet switched services. The SGSN 140, like the MSC 110, can be coupled to a data network 30, such as, for example, the Internet, or private network (e.g., a GPRS roaming exchange (GRX), an Internetwork Packet Exchange (IPX), a CDMA (Code Division Multiple Access) Packet Data Roaming Exchange (CRX), etc.). The network 30 may be used between mobile operators for data roaming as well as for any other suitable communications. The SGSN 140 can be directly coupled to the data network. In an example embodiment, however, the SGSN 140 is coupled to a packet-switched core network, such as a GPRS core network 145 (also referred to herein as GPRS system 145). The packet-switched core network is then coupled to another gateway, such as a GTW GPRS support node (GGSN) 150, and the GGSN 150 is coupled to the network 30 (e.g., the Internet). In addition to the GGSN 150, the packet-switched core network may also be coupled to a GTW 120.

In addition, by coupling the SGSN 140 to the GPRS core network 145 and the GGSN 150, devices such as a network device 115 (e.g., a server (e.g., a WiTT server), network device 125 (e.g., a server (e.g., a server of an operator such as, for example, a cellular operator), and/or network device 135 may be coupled to the mobile stations 105 via the network 30. In this regard, devices such as the network device 115, the network device 125, and/or network device 135 may communicate with each other and/or with the mobile stations 105 across the SGSN 140, GPRS core network 145, the GGSN 150 and the network 30. By directly or indirectly connecting mobile stations 105 and the other devices (e.g., network device 115, network device 125, network device 135, etc.) to the network 30, the mobile stations 105 may communicate with the other devices and with one another, such as according to the Hypertext Transfer Protocol (HTTP), to thereby carry out various functions of the mobile stations 105.

The mobile stations 105 may further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including, Wireless Fidelity (Wi-Fi), wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the network 30. Like with the MSC 110, the APs 62 can be directly coupled to the network 30. In one embodiment, however, the APs 62 are indirectly coupled to the network 30 via a GTW 48.

II. Exemplary Witt Network Device

Figure 2:
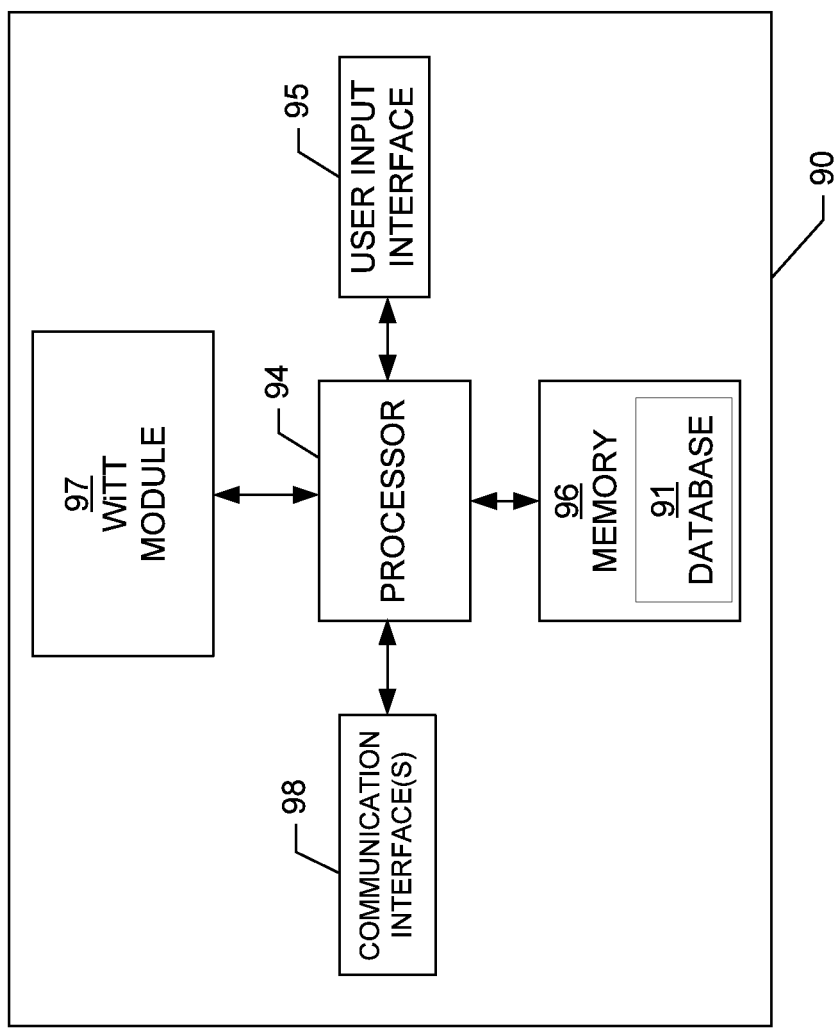
FIG. 2 is a schematic block diagram of a network device according to an example embodiment of the invention.

Referring now to FIG. 2, a block diagram of one example of a network device (e.g., a server) is provided. As shown in FIG. 2, the network device 90 (also referred to herein as a Wi-Fi Talk & Text (WiTT) network device 90) (e.g., network device 115) generally includes a processor 94 and an associated memory 96. The memory 96 may comprise volatile and/or non-volatile memory, and may store content, data and/ or the like. For example, the memory may store content, data, information, and/or the like transmitted from, and/or received by, the network device. Also for example, the memory 96 may store client applications, instructions, and/or the like for the processor 94 to perform the various operations of the network device 90 in accordance with an embodiment of the invention, as described herein. The memory 96 may include a database 91 that stores indications of detected access points (APs) (e.g., Wi-Fi APs, WLAN APs, etc.) as well as other data (e.g., Mobile Station Integrated Services Digital Networks (MSISDNs), international mobile subscriber identities (IMSIs), etc.).

Additionally, as such, whether configured by hardware or software methods, or by a combination thereof, the processor 94 may comprise an entity capable of performing operations according to embodiments of the present invention while configured accordingly. Thus, for example, when the processor 94 is embodied as an ASIC, FPGA or the like, the processor 94 may comprise specifically configured hardware for conducting one or more operations described herein. Alternatively, as another example, when the processor 94 is embodied as an executor of instructions, such as may be stored in the memory 96, the instructions may specifically configure the processor 94 to perform one or more algorithms and operations described herein.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the WiTT network device 90 to receive data from a user, such as a keypad, a touch display, a joystick, a microphone and a speaker or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied as, include or otherwise control the WiTT module 97. The WiTT module 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the WiTT module 97, as described below. Thus, in an example in which software is employed, a device or circuitry (e.g., the processor 94 in one example) executing the software forms the structure associated with such means.

III. Exemplary Mobile Station

Figure 3:
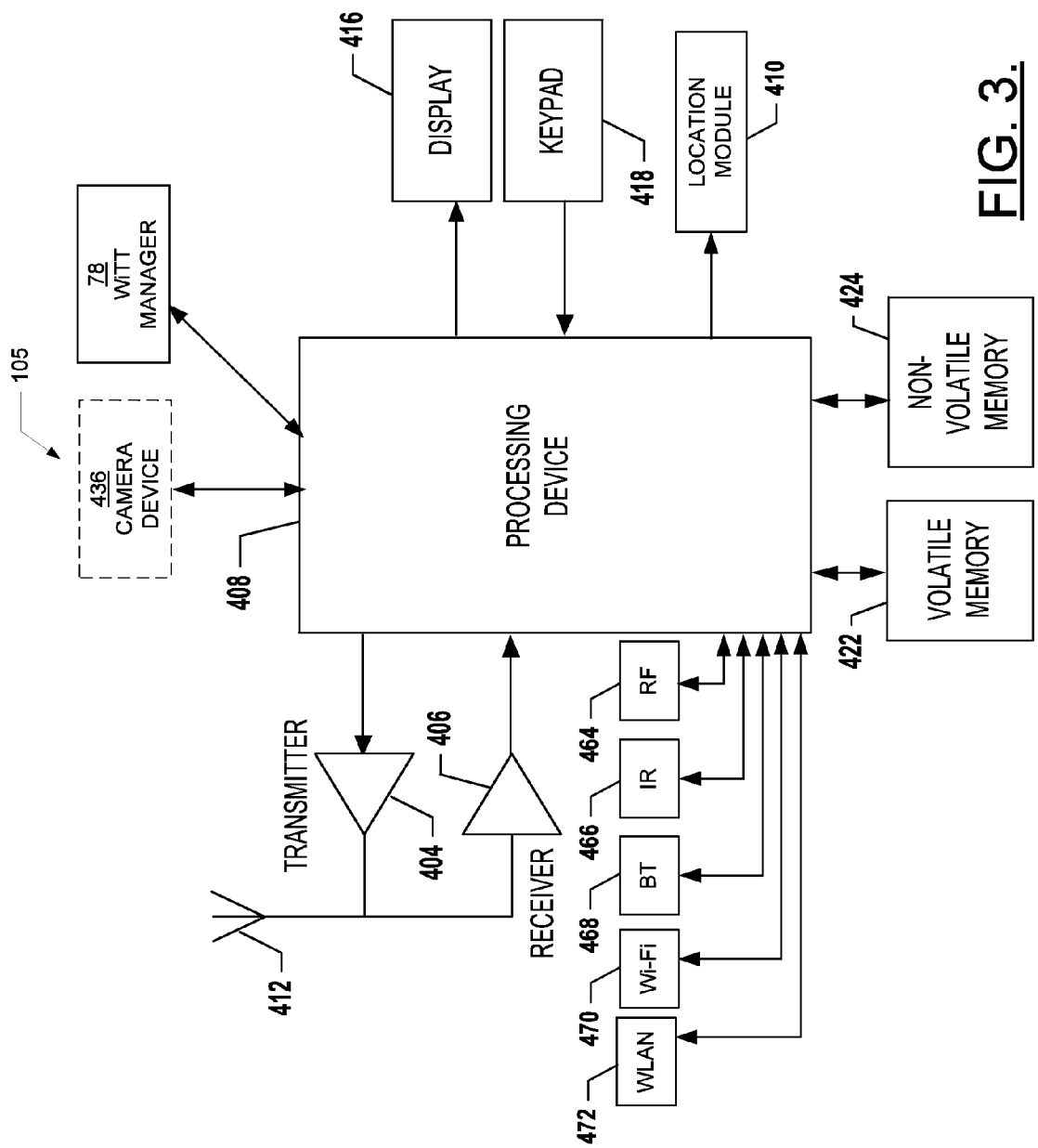
FIG. 3 is a schematic block diagram of a mobile station according to an example embodiment of the invention.

FIG. 3 provides an illustrative schematic representative of a mobile station 105 that may be used in conjunction with the example embodiments of the invention. As shown in FIG. 3, the mobile station 105 (also referred to herein as MS 105) may include an antenna 412, a transmitter 404, a receiver 406, and a processing device 408 (e.g., a processor, controller, and/or the like) that provides signals to and receives signals from the transmitter 404 and receiver 406, respectively.

The signals provided to and received from the transmitter 404 and the receiver 406, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of second-generation ("2G") communication protocols, third-generation ("3G") communication protocols, fourth-generation ("4G"), Global System for Mobile Communications ("GSM"), Universal Mobile Telecommunications System ("UMTS"), Long Term Evolution ("LTE"), LTE-Advanced ("LTE-A") GPRS, W-CDMA, CDMA communication protocols, and/or the like. Further, for example, the mobile station 105 may operate in accordance with any of a number of different wireless networking techniques, including Bluetooth, Wireless Local Area Network (WLAN), IEEE 802.11 ("Wi-Fi"), 802.16 ("WiMAX"), ultra wideband ("UWB"), and/or the like. Via these communication standards and protocols, the mobile station 105 may communicate with various other entities using concepts such as Unstructured Supplementary Service Data ("USSD"), Short Message Service ("SMS"), Dual-Tone Multi-Frequency Signaling ("DTMF"), and/or Subscriber Identity Module Dialer ("SIM dialer"). The mobile station 105 can also download changes, add-ons, and updates, for instance, to its firmware, software (e.g., including modules), and operating system.

The mobile station 105 may also comprise an optional user interface (that can include a display 416 coupled to a processing device 408) and/or a user input interface (coupled to the processing device 408). The user input interface can comprise any of a number of devices allowing the mobile station 105 to receive data, such as a keypad 418, a touch display, voice or motion interfaces, or other input device. In embodiments including a keypad 418, the keypad 418 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 may further include a location module 410 in communication with the processing device 408. The location module 410 may be any device or means for locating the position of the mobile station 105. The location module 410 may include all hardware for locating the position of a mobile station 105. Alternatively or additionally, the location module 410 may utilize a memory (e.g., volatile memory 422, non-volatile memory 424) of the mobile station 105 to store instructions for execution by the processing device 408 in the form of software necessary to determine the position or location of the mobile station 105. Additionally, the location module 410 is capable of utilizing the processing device 408 to transmit/receive, via the transmitter 404/receiver 406, locational information (e.g., one or more geolocation codes (e.g., an identifier indicating a geographic location of an object (e.g., mobile station 105)) such as the position of the mobile station 105, to a network device (e.g., a server), such as, for example, the network devices 115, 125, 135.

The mobile station 105 may also include a Near Field Communications (NFC) transceiver (also referred to herein as short range radio frequency (RF) transceiver) and/or interrogator 464 so data may be shared with and/or obtained from electronic devices (e.g., a RF access point(s)) in accordance with RF techniques. The mobile station 105 may also include other transceivers such as, for example, an infrared (IR) transceiver 466, a Bluetooth (BT) transceiver 468 operating using Bluetooth brand wireless technology developed by the Bluetooth Special Interest Group, and/or the like. Additionally, the mobile station 105 may include a Wi-Fi transceiver 470 configured to transmit and/or receive data from electronic devices (e.g., a Wi-Fi access point(s)) according to a Wireless Fidelity (Wi-Fi) technique. The mobile station 105 may also include a WLAN transceiver 472 configured to transmit and/or receive data from electronic devices (e.g., a WLAN access point(s)) according to various wireless networking techniques, including WLAN techniques such as IEEE 802.11 techniques, and/or the like. In this regard, the mobile station 105 and, in particular, the Near Field Communications transceiver may be capable of transmitting data to and/or receiving data from electronic devices (e.g., a tag (e.g., a Radio-Frequency Identification (RFID) tag), an IR access point(s), a BT access point(s), a Wi-Fi AP, a WLAN AP, etc.) within a proximity of the mobile station 105, such as within 10 meters, for example.

The mobile station 105 may also include an optional camera device 436. The camera device 436 may include a camera, video and/or audio module, in communication with the processing device 408 and the display 416. The camera device 436 may be any means for capturing an image, video and/or audio for storage, display or transmission. For example, the camera device 436 may include a digital camera configured to form a digital image file from a captured image. As such, the camera device 36 may include all hardware, such as a lens or other optical component(s), and software necessary for creating a digital image file from a captured image. In an alternative example embodiment, the camera device 436 may include only the hardware needed to view an image, while a memory device (e.g., volatile memory 422 and/or non-volatile memory 424) of the mobile station 105 stores instructions for execution by the processing device 408 in the form of software necessary to create a digital image file from a captured image.

In some cases, the camera device 436 may provide live image data to the display 416. In this manner, the camera device 436 may facilitate or provide a camera view to the display 416 to show live image data, still image data, video data, or any other data.

The mobile station 105 may also include volatile memory 422 and/or non-volatile memory 424, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory (e.g., volatile memory 422, non-volatile memory 424) may be an electronic storage device (e.g., a computer readable storage medium) comprising gates configured to store data (e.g., bits) that may be retrievable by a machine (e.g., a computing device like processing device 408). In an example embodiment, the memory may be a tangible memory that is not transitory. The memory may be configured to store instructions (e.g., software instructions, computer program code instructions) for execution by the processing device 408. In this regard, for example, the memory may store content, such as computer program code for an application and/or other computer programs.

In an example embodiment, the processing device 408 may be embodied as, include or otherwise control the WiTT manager 78. The WiTT manager 78 may be any means such as a device or circuitry operating in accordance with software or otherwise embodied in hardware or a combination of hardware and software (e.g., processing device 408 operating under software control, the processing device 408 embodied as an ASIC or FPGA specifically configured to perform the operations described herein, or a combination thereof) thereby configuring the device or circuitry to perform the corresponding functions of the processing device 408, as described below. Thus, in an example in which software is employed, a device or circuitry (e.g., the processing device 408 in one example) executing the software forms the structure associated with such means.

IV. Exemplary Network Device

Figure 4:
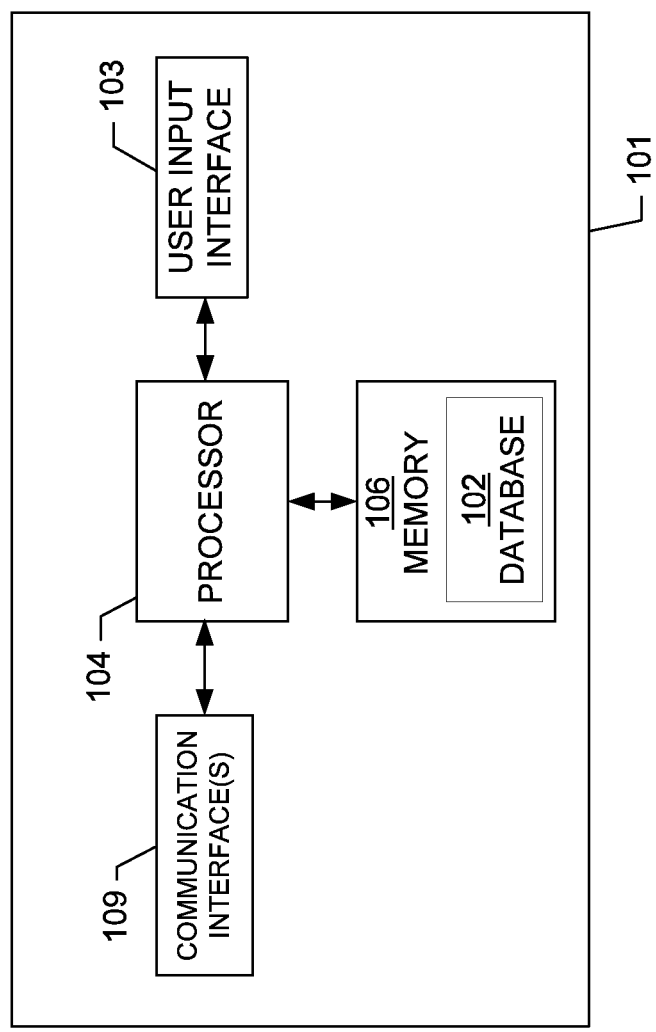
FIG. 4 is a schematic block diagram of a network device according to another example embodiment of the invention.

Referring now to FIG. 4, a block diagram of an example embodiment of a network device is provided. In an example embodiment, the network device 101 (e.g., network device 125). As shown in FIG. 4, the network device (e.g., a server) generally includes a processor 104 and an associated memory 106. The memory 106 may comprise volatile and/or non-volatile memory, and may store content, data and/or the like. The memory 106 may store client or server applications, instructions, and/or the like for the processor 104 to perform the various operations of the network device 101. In an example embodiment, the memory 106 may include a database 102 that stores MSISDNs, IMSIs of corresponding communication devices and any other suitable data. The database 102 may store data indicating whether users/subscribers of communication devices are authorized to utilize a WiTT service.

The processor 104 may also be connected to at least one communication interface 109 or other means for displaying, transmitting and/or receiving data, content, and/or the like. The user input interface 103 may comprise any of a number of devices allowing the network device 101 to receive data from a user, such as a keypad, a touch display, a joystick or other input device. In this regard, the processor 104 may comprise user interface circuitry configured to control at least some functions of one or more elements of the user input interface. The processor 104 and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

V. Exemplary System

Figure 5:
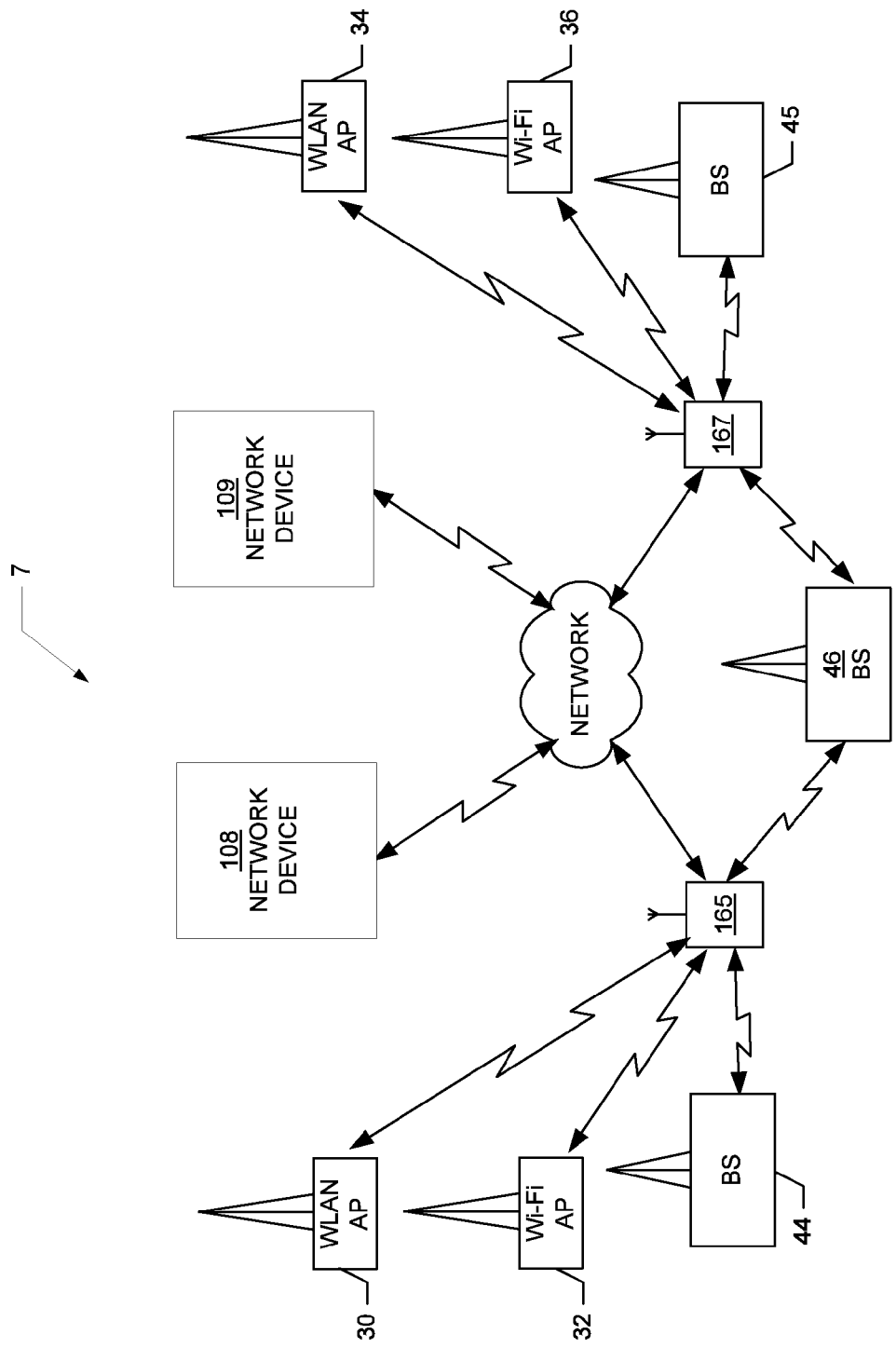
FIG. 5 is schematic block diagram of a system according to an example embodiment of the invention.

Referring now to FIG. 5, an example embodiment of a system according to an example embodiment is provided. The system 7 may include one or more access points (APs) such as, for example, a WLAN AP 30, a Wi-Fi AP 32, a WLAN AP 34 and a Wi-Fi AP 36. The system 7 may also include one or more cellular towers, such as, for example, base stations (BSs) 44, 45, 46. Additionally, the system 7 may include one or more communication devices 165 and 167 (e.g., e.g., mobile station 105) as well as network device 108 (e.g., network device 90) and network device 109 (e.g., network device 101).

In the example embodiment of FIG. 5, the network device 108 (e.g., also referred to herein as WiTT network device 108) may be dedicated to switching a communication device (e.g., communication device 165, communication device 167) from cellular communications to IP-based (e.g., SIP-based) communications (e.g., calling and/or messaging) in response to receiving an indication from a communication device(s) indicating that the communication device(s) is within a proximity of an access point(s) (e.g., WLAN AP 30, Wi-Fi AP 32, WLAN AP 34, Wi-Fi AP 36). In this regard, a communication device may utilize a detected access point(s) (e.g., WLAN AP 30, Wi-Fi AP 32, WLAN AP 34, Wi-Fi AP 36) to facilitate a call and/or other communication(s) (e.g., a message(s)). As referred to herein, communications by one or more communication devices (e.g., communication device 165, communication device 167) via an access point(s) (e.g., WLAN AP 30, Wi-Fi AP 32, WLAN AP 34, Wi-Fi AP 36) may be referred to herein as WiTT communications. The WiTT communications may be managed and provisioned as a WiTT service by the WiTT network device 108. In an example embodiment, the network device 108 may communicate with an operator of network device 109 to determine whether a user or subscriber of a communication device(s) (e.g., communication device 165, communication device 167) is authorized to activate and utilize the WiTT service, as described more fully below. The network device 109 (also referred to herein as cellular network device 109) may provide cellular communications to one or more communication devices (e.g., communication device 165, communication device 167) via a cellular service.

Although FIG. 5 shows one WLAN AP 30, one Wi-Fi AP 32, one WLAN AP 34, one WLAN AP 36, three cellular towers (e.g., BS's 44, 45, 46), two communication devices 165, 167, and two network devices 108, 109, it should be pointed out that any suitable number of WLAN APs 30, Wi-Fi APs 32, WLAN APs 34, Wi-Fi APs 36, cellular towers (e.g., BS's), communication devices 165, 167 and network devices 108, 109 may be part of the system 7 without departing from the spirit and scope of the invention.

VI. Exemplary Operation

In the example embodiment of FIG. 5, the WiTT network device 108 may transfer cellular service provided to a communication device(s) (e.g., communication device 165, communication device 167) from the network device (e.g., network device 109) providing cellular communication services to one or more wireless access points (e.g., WLAN AP 30, Wi-Fi AP 32, WLAN AP 34, Wi-Fi AP 36) providing IP-based (e.g., SIP-based) communications.

In an instance in which the WiTT manager 78 of a communication device (e.g. communication device 165, communication device 167) detects a signal from a wireless local network(s) such as, for example, an access point(s) (e.g., WLAN AP 30, Wi-Fi AP 32, WLAN AP 34, Wi-FI AP 36), the WiTT manager 78 may send a message to the WiTT network device 108. The message sent to the WiTT network device 108 may indicate a request by the WiTT manager 78 to transfer communications by using the WiTT service. In this regard, the WiTT network device 108 may verify or authenticate that the user of the communication device is authorized to utilize the WiTT service. In response to determining that the user is authorized to utilize the WiTT service, the WiTT network device 108 may turn off or deactivate the cellular services of the communication device (e.g., communication device 165) and may enable the communication device (e.g., communication device 165) to utilize a detected wireless local network(s) (e.g., WLAN AP 30, Wi-Fi AP 32, WLAN AP 34, Wi-Fi AP 36) for communications such as, for example, IP-based (e.g., SIP-based) communications corresponding to voice calls, messaging (e.g., data messages (e.g., Short Message Service (SMS) messages, Multimedia Messaging Service (MMS) messages)) and/or other communication data. In this regard, a WiTT module 97 of the network device 108 may switch calls and/or messaging (e.g., SMS messages, MMS messages, etc.) from a network (e.g., network device 109) that provides cellular service to a wireless local network, detected by the communication device (e.g., communication device 165), providing IP-based communications.

For purposes of illustration and not of limitation, consider an example in which the WiTT manager 78 of a communication device (e.g., communication device 165) detects a Wi-Fi signal (e.g., a beacon) from a Wi-Fi access point (e.g., Wi-Fi AP 32) at a coffee shop. In this regard, in an instance in which the WiTT manager 78 determines that it has not previously detected this Wi-Fi access point at the coffee shop, the WiTT manager 78 may provide an indication or notification (e.g., via visible indicia provided to a display (e.g., display 416)) to a user of the communication device requesting the user to verify whether the user wants the WiTT service to be active for this Wi-Fi access point. In response to the receipt of an indication of the network device 108 from the WiTT manager 78 that the user selected the WiTT service to be active on the Wi-Fi access point of the coffee shop, the WiTT module 97 may store an indication of the Wi-Fi access point in a database (e.g., database 91) of a memory (e.g., memory 96). As such, in an instance in which the WiTT manager 78 detects this Wi-Fi access point of the coffee shop in the future, WiTT module 97 may transfer a cellular communication(s) (e.g., a call (e.g., a voice call), a data message (e.g., a SMS message, a MMS message) provided via a cellular network (e.g., network device 109) of the communication device onto the WiTT service while the user is at the coffee shop. In this manner, the communication device may utilize the Wi-Fi access point of the coffee shop for communications (e.g., IP communications (e.g., a VoIP call, a SMS message, a MMS message)) transferred from the cellular network.

In an example embodiment, the WiTT module 97 of the network device 108 may not necessarily transfer an active call (e.g., a voice call) in real time in all instances. For instance, referring back to the coffee shop example, in an instance in which the user enters the coffee shop and is in an active call via the communication device (e.g., communication device 165), the WiTT module 97 may leave the call on the cellular network (e.g., network device 109) until the call is ended in order to minimize the impact of interrupting the call and dropping the call. Thereafter, the WiTT module 97 may activate the WiTT service such that subsequent communications with the Wi-Fi access point of the coffee shop are facilitated via the Wi-Fi access point. On the other hand, the WiTT module 97 may activate the WiTT service in real time for messaging (e.g., SMS messages, MMS messages) and other data communications (e.g., email messages, etc.). As such, the WiTT manager 78 may utilize the detected Wi-Fi access point of the coffee shop, for example, in real time when communicating messaging and other data communications.

In an example embodiment, activation of the WiTT service may be securely accomplished by the WiTT network device 108 communicating with a communication device (e.g., communication device 165, communication device 167). For example, the first instance in which the WiTT manager 78 is activated or executed, the WiTT manager 78 may communicate with the WiTT module 97 of the network device 108 to utilize the WiTT service. In this regard, the WiTT module 97 of the network device 108 may communicate with the WiTT manager of the communication device to attempt to establish security credentials for the first time. As such, the WiTT module 97 of the network device 108 may leverage an existing cellular service provided by a network (e.g., network device 109) to determine whether the user of the communication device is authorized to utilize the WiTT service.

For instance, the WiTT module 97 of the network device 108 may perform a process to attempt to establish a SIP communication(s) and a SMS message over a cellular network (e.g., network device 109) simultaneously or concurrently to authenticate that the WiTT manager 97 running or being executed on a communication device is authorized to utilize the cellular network (e.g., cellular network 109) and the WiTT service based in part on a particular identity (e.g., a MSISDN, a IMSI, etc.), as described more fully below.

Figure 6:
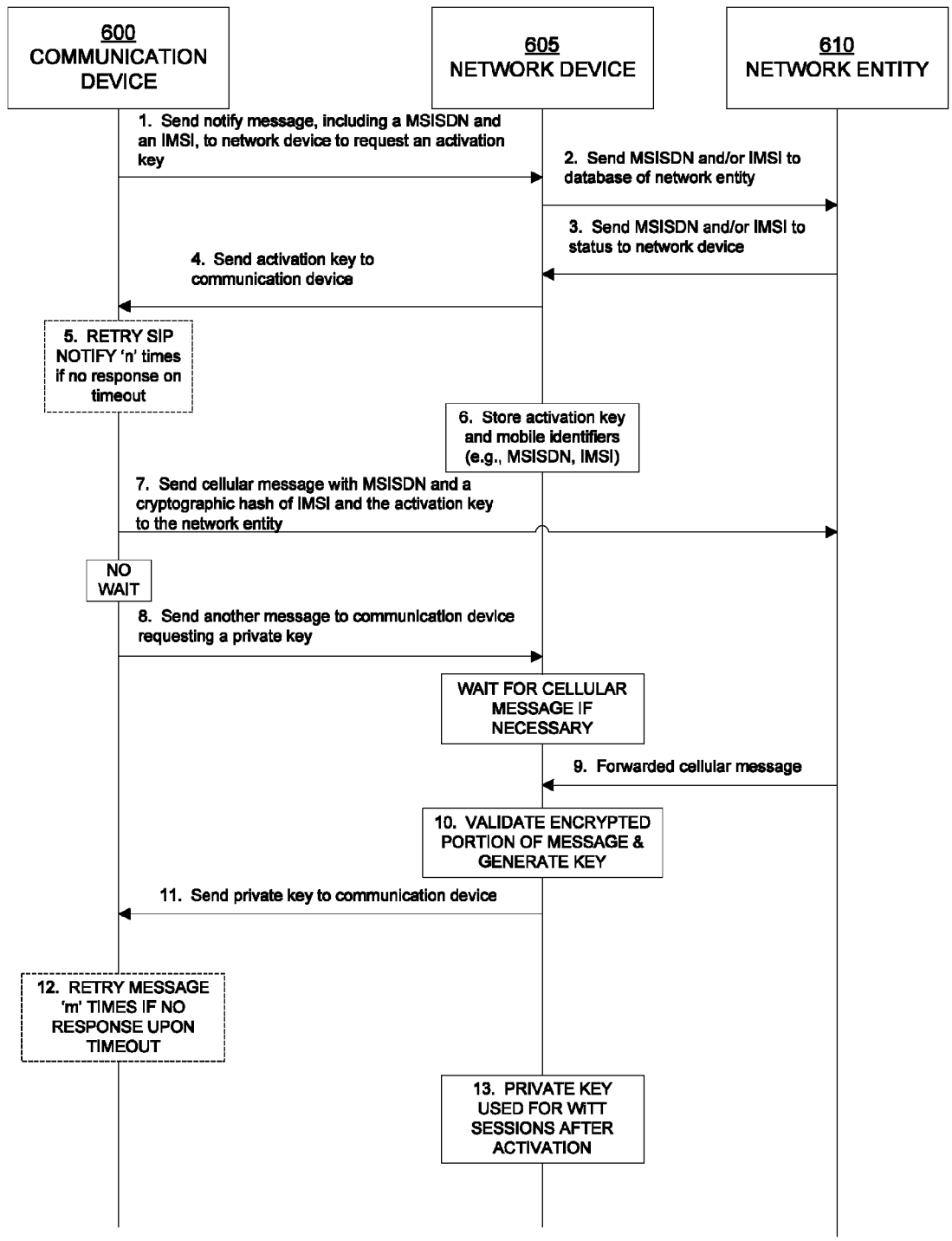
FIG. 6 is a diagram of a signal flow according to an example embodiment of the invention.

Referring now to FIG. 6, a diagram illustrating a signal flow according to an example embodiment is provided. In response to the WiTT manager 78 detecting a wireless local network (e.g., Wi-Fi AP 32), the WiTT manager 78 may wake up and determine that it does not have the credentials to access the WiTT service. As such, the WiTT manager 78 may send a notify message (e.g., a SIP NOTIFY message) to WiTT module 97 of the network device and may request an activation key (e.g., a temporary activation key). As such, at operation 1, a communication device 600 (e.g., communication device 165, communication device 167) may initiate authentication by establishing a secure channel and sending a message (e.g., a SIP NOTIFY) message to the network device 605 (also referred to herein as WiTT network device 605) (e.g., network device 108) requesting an activation key. An MSISDN (e.g., a phone number) and/or an IMSI (International Mobile Subscription Identity) may be included in the message by a WiTT manager (e.g., WiTT manager 78) of the communication device 600.

At operation 2, the WiTT network device 605 may send the MSISDN and/or the IMSI in a query/message to a database (e.g., database 102) of a cellular network (e.g., network entity 610 (e.g., network device 109)) to ensure that the identities (e.g., the MSISDN and/or the IMSI) provided are valid and that the user of the communication device 600 is authorized to utilize the WiTT service. In one example embodiment, the query sent to the network entity 610 (also referred to herein as cellular network entity 610) may be sent according to a Lightweight Directory Address Protocol (LDAP). In another example embodiment, the query may be sent to a Home Location Register (HLR) of the network entity 610 via Signaling System No. 7 (SS7) or the like. At operation 3, a processor (e.g., processor 104) of the network entity 610 may analyze the database and may return status information to the network device 605 indicating whether the MSISDN and/or IMSI are valid (e.g., associated with a current subscription). In an instance in which the WiTT module (e.g., WiTT module 97) of the network device 605 determines that the MSISDN and/or the IMSI are invalid (e.g., not associated with a current subscription), the WiTT module 97 may terminate the activation by the WiTT manager 78 to utilize the WiTT service.

At operation 4, in an instance in which the WiTT module 97 of the network device 605 determines that the MSISDN and/or IMSI are valid, the WiTT module 97 may provide an activation key (e.g., an encrypted activation key (e.g., a temporary activation key)) to the communication device 600. The activation key may be provided by the WiTT module 97 to the communication device 600 in a message (e.g., a 200 OK message including an activation key). Optionally, at operation 5, in an instance in which the communication device 600 does not receive the activation key within a timeout period, the communication device 600 may retry sending of the message (e.g., a SIP NOTIFY message) requesting the activation key 'n' times and may then declare a failure to activate the user on the WiTT service in an instance in which the activation key is not received in the timeout period. In an example embodiment, the network device 605 may also send a message (e.g., a SIP message) rejecting an invalid MSISDN and/or IMSI.

At operation 6, the WiTT module 97 of the network device 605 may store the activation key and the mobile identifiers (e.g., the MSISDN, IMSI, etc.). At operation 7, the communication device may generate a cellular message (e.g., a cellular SMS message) containing a MSISDN of the communication device and an encrypted form of the IMSI and activation key (e.g., a cryptographic hash). The communication device may send the generated cellular message (e.g., cellular SMS message) to a cellular network (e.g., network entity 610) providing cellular service to the communication device 600.

At operation 8, without waiting for any response from the network entity 610 regarding the cellular message (e.g., cellular SMS message), the communication device 600 may send a second message (e.g., a SIP NOTIFY message), to the network device 605 requesting a private key. At operation 9, the WiTT network device 605 may receive the second message (e.g., a SIP NOTIFY message) and a forwarded cellular message (e.g., cellular SMS message) from the cellular network (e.g., network entity 610) in any order. In this example, the cellular message (e.g., cellular SMS message) forwarded from the cellular network (e.g., network entity 610) may take longer to arrive. However, the WiTT network device 605 may, for example, simultaneously or concurrently receive both the message requesting the private key from the communication device 600 and the forwarded SMS message from the cellular network (e.g., network entity 610). The forwarded cellular message (e.g., cellular SMS message) received from the cellular network (e.g., network entity 610) may indicate that the user of the communication device 600 is authorized to utilize the cellular network (e.g., cellular network entity 610) based in part on a processor (e.g., processor 104) of the cellular network analyzing the mobile identities (e.g., MSISDN, IMSI, etc.) of communication device 600 and confirming that the user is authorized to use the cellular network. The forwarded cellular message (e.g., cellular SMS message) received from the network entity 610 may be sent via SS7 SMS message.

At operation 10, when the forwarded cellular message (e.g., cellular SMS message) and the SIP NOTIFY are both received by the WiTT network device 605, the encrypted portion (e.g., a cryptographic hash) of the cellular message (e.g., cellular SMS message) may be validated by the WiTT module 97 using the stored MSISDN, the activation key and the IMSI. In an instance in which only the second message (e.g., a SIP NOTIFY message) requesting the private key is received, the WiTT network device 605 may send an error message to the communication device 600. In an instance in which only the cellular message (e.g., cellular SMS message) is received by the WiTT network device 605 during a timeout period, the cellular message (e.g., cellular SMS message) may be discarded by the WiTT network device 605.

At operation 11, in an instance in which the WiTT module 97 of the network device 605 determines that the forwarded cellular message (e.g., cellular SMS message) and the message (e.g., a SIP NOTIFY message) requesting the private key are valid, the WiTT module 97 of the WiTT network device 605 may send the private key to the communication device. In an example embodiment, the WiTT network device 605 may send the private key (also referred to herein as WiTT private key (WPK)) to the communication device in an encrypted message (e.g., a SIP 200 OK message). In this regard, the communication device 600 may extract the WiTT private key and store it for later use. For example, in the future when the communication device 600 attempts to register to utilize the WiTT service, the WiTT module 97 may send the communication device 600 a challenge (e.g., a random challenge) to prove that the communication device 600 was assigned the private key to utilize the WiTT service and switch communications from the cellular network (e.g., cellular network entity 610) to a detected wireless local network, as described more fully below.

Optionally, at operation 12, in an instance in which the communication device 600 does not receive a response (e.g., a SIP response) for the requested private key within a timeout period the communication device 600 may retry transmission of both the message (e.g., SIP NOTIFY message) requesting the private key and the cellular message (e.g., cellular SMS message) up to 'm' times during a timeout period.

At operation 13, the private key may also be stored by the WiTT network device 605 for use on each future transaction by the user/subscriber of the communication device 605. For example, in an instance in which the communication device 600 detects a wireless local network (e.g., a Wi-Fi AP) in a subsequent instance and desires to switch communications to the detected wireless local network, the WiTT module 97 of the WiTT network device 605 may utilize the stored private key to authorize the communication device to utilize the WiTT service to transfer the communications to the wireless local network. In addition, the activation key may be temporary and may be deleted, by the WiTT network device 605, at this time, along with associated information.

Figure 7:
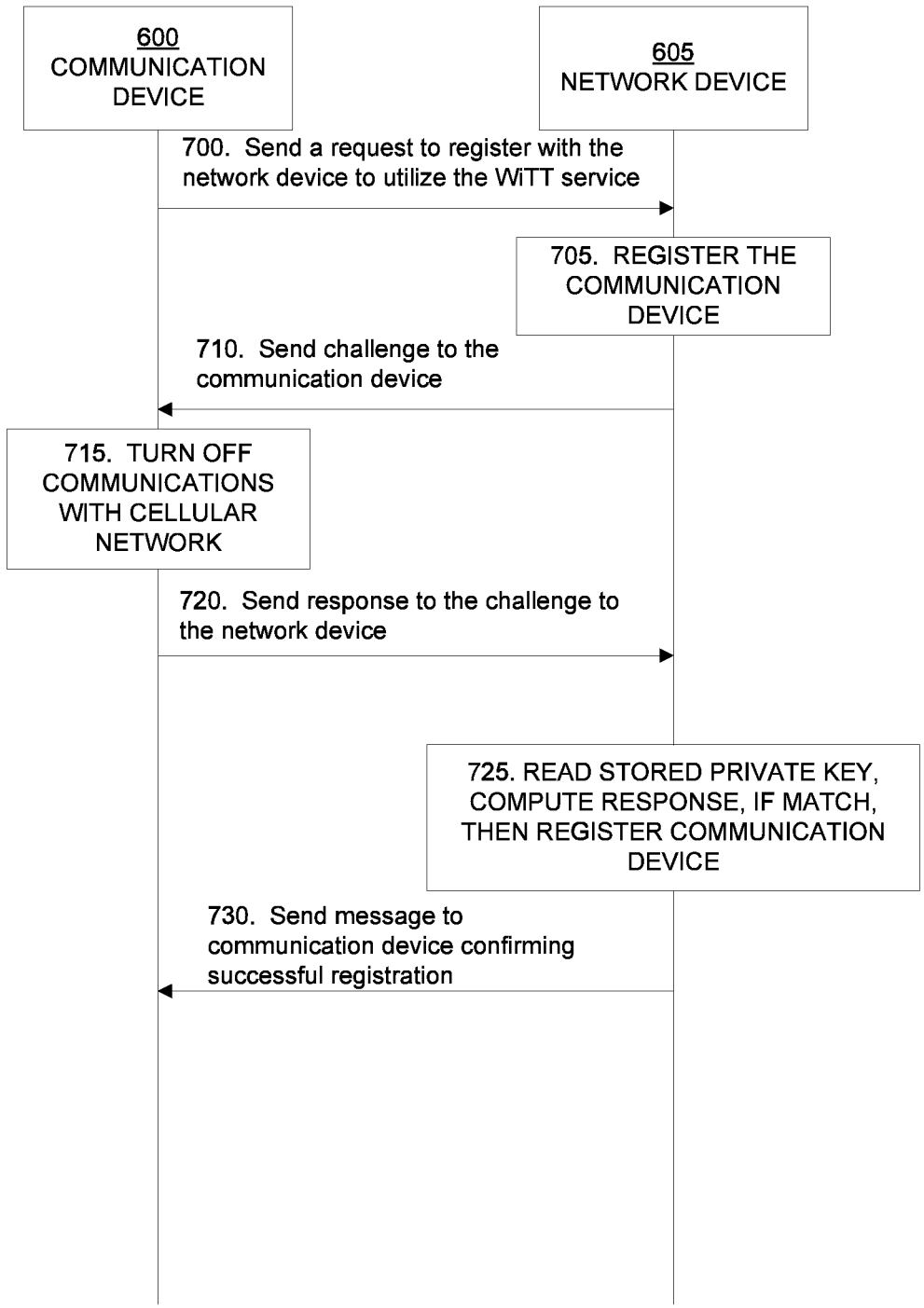
FIG. 7 is a diagram of a signal flow according to another example embodiment of the invention.

Referring now to FIG. 7, a signal flow diagram according to another example embodiment is provided. In the example embodiment of FIG. 7, the communication device has previously received the WiTT private key from the WiTT module 97 of the network device and as such is previously activated to utilize the WiTT service. In response to the communication device 600 subsequently detecting a wireless local network (e.g., Wi-Fi AP 32), the user of the communication device 605 may desire to transfer communication services from a cellular network to the detected wireless local network. In this regard, at operation 700, the communication device 600 may send a request to the network device 605 to register (e.g., a SIP register) with the network device to utilize the WiTT service. The request to register (e.g., a SIP register) sent to the network device 605 may be a request to transfer or switch communication services from the cellular network to a detected wireless local network (e.g., Wi-Fi AP 32). The request may include data indicating an MSISDN (e.g., phone number) and/or an IMSI of the communication device 600. The WiTT module 97 of the network device 605 may analyze the MSISDN and/or IMSI received in the request and compare this data to a corresponding MSISDN and/or IMSI stored in memory (e.g., memory 96) and may determine that the communication device 600 was previously authorized to utilize the WiTT service. As such, at operation 705, the WiTT module 97 of network device 605 may register the communication device 600 to utilize the WiTT service to transfer communications to a detected wireless local network.

At operation 710, the WiTT module 97 of the network device 605 may send a challenge (e.g., a random challenge (e.g., a random challenge per Request for Comments (RFC) 2617)) to the communication device 600. The sent challenge may include a random value. At operation 715, in response to receiving the challenge from the network device 605, the communication device 600 may turn off communications with a cellular network (e.g., network entity 615). At operation 720, the WiTT manager 78 of the communication device may send a response (e.g., a SIP register response) to the challenge to the network device 605. The communication device may determine a response value by running a hash on the WiTT private key previously received from the network device 605. The response value may be included in the response sent to the network device. At operation 725, the WiTT module 97 of the network device 605 may read or analyze a stored private key assigned to a user of the communication device and may compute a response. In an instance in which the response to the challenge provided by the communication device matches the response (e.g., the response value) computed by the WiTT module 97 of the network device 605, the WiTT module 97 may determine that the communication device 605 is registered to utilize the WiTT private key for communications with a detected wireless local network (e.g., Wi-Fi AP 32, WLAN AP 30, etc.). The WiTT module 97 may determine that the computed response matches the response received from the communication device, in an instance in which the WiTT module 97 runs the same hash function on the WiTT private key that is stored by the network device and calculates the same value as the response value determined by the WiTT manager 78 of the communication device 600. On the other hand, in an instance in which the computed response does not match the response received from the communication device, the WiTT module 97 of the network device 605 may send an error message to the communication device. In this regard, the communication device 605 may need to communicate with the network device 605 again to obtain a temporary activation key and subsequently another WiTT private key per the approach of FIG. 6. At operation 730, the WiTT module 97 of the network device 605 may send a message (e.g., a SIP 200 OK message) to the communication device 600 confirming the successful registration indicating that the user is still authorized to utilize the previously received WiTT private key for WiTT service. As such, in response to receipt of the message indicating the successful registration, the communication device 600 may switch communications (e.g., a voice call and/or messaging (e.g., a SMS message, a MMS message and other data) from a cellular network to a detected wireless local network.

Figure 8:
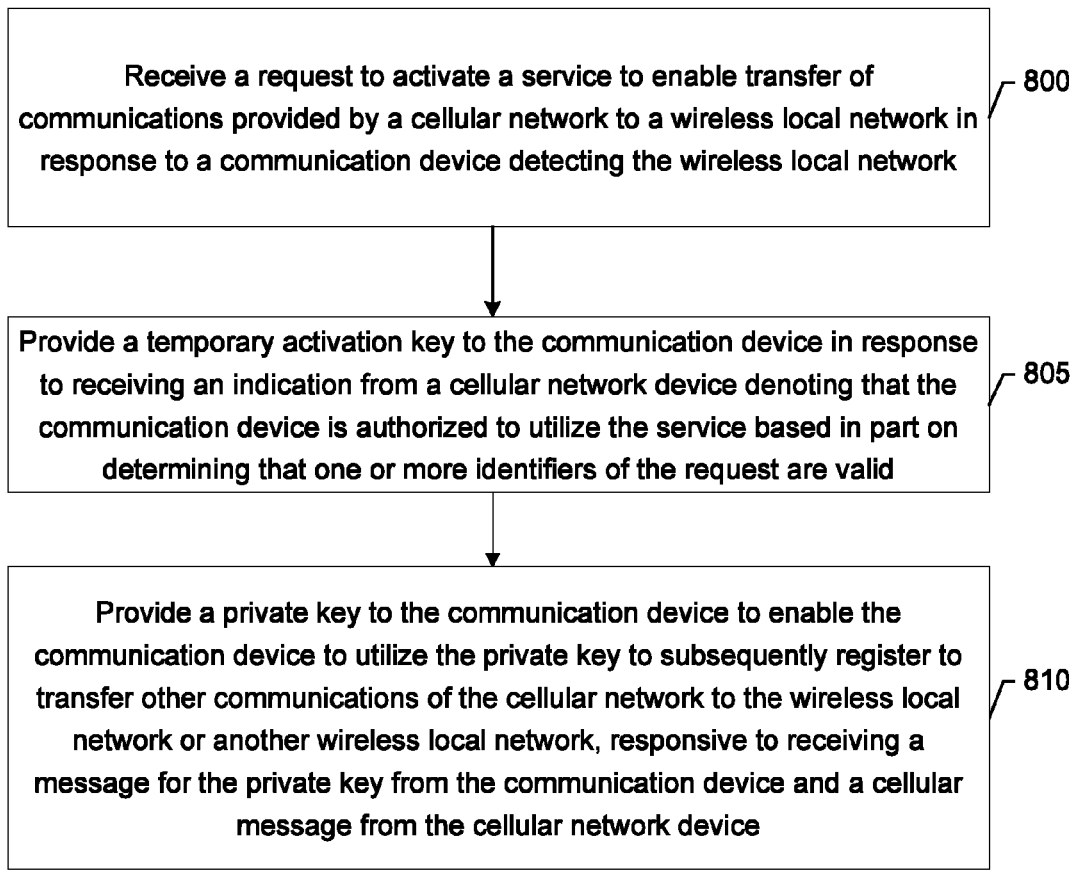
FIG. 8 is a flowchart illustrating operations performed in accordance with one example embodiment of the invention.

Referring now to FIG. 8, a flowchart of an example method for authorizing a WiTT service is provided. At operation 800, an apparatus (e.g., WiTT network device 605 (e.g., network device 108)) may receive a request (e.g., a SIP NOTIFY message) to activate a service (e.g., a WiTT service) to enable transfer of communications provided by a cellular network device (e.g., cellular network entity 610 (e.g., network device 109)) to a wireless local network (e.g., Wi-Fi AP 32, WLAN AP 30) in response to a communication device (e.g., communication device 600 (e.g., communication device 165)) detecting the wireless local network. At operation 805, an apparatus (e.g., WiTT network device 605) may provide a temporary activation key to the communication device in response to receiving an indication from a cellular network device denoting that the communication device is authorized to utilize the service based in part on determining that one or more identifiers (e.g., an MSISDN, an IMSI) of the request are valid.

At operation 805, an apparatus (e.g., WiTT network device 605) may provide a private key to the communication device to enable the communication device (e.g., communication device 600) to utilize the private key to subsequently register to transfer other communications of the cellular network device to the wireless local network (e.g., Wi-Fi AP 30) or another wireless local network (e.g., Wi-Fi AP 36). The apparatus may provide the private key to the communication device in response to receiving a message (e.g., a SIP NOTIFY message) for the private key from the communication device and receiving a cellular message (e.g., a cellular SMS message) from the cellular network device. The cellular message was initially received by the cellular network device (e.g., cellular network entity 610) from the communication device (e.g., communication device 600).

It should be pointed out that FIGS. 6, 7 and 8 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., volatile memory 422, non-volatile memory 424, memory 96, memory 106) and executed by a processor (e.g., processing device 408, processor 94, processor 104, WiTT manager 78, WiTT module 97). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 6, 7 and 8 above may comprise a processor (e.g., the processing device 408, the processor 94, processor 104, the WiTT manager 78, the WiTT module 97) configured to perform some or each of the operations (1-13, 700-730, 800-810) described above. The processor may, for example, be configured to perform the operations (1-13, 700-730, 800-810) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1-13, 700-730, 800-810) may comprise, for example, the processing device 408 (e.g., as means for performing any of the operations described above), the processor 94, the processor 104, the WiTT manager 78, the WiTT module 97 and/or a device or circuitry for executing instructions or executing an algorithm for processing information as described above.

VII. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A method comprising:
receiving a request to activate a service to enable transfer of communications provided by a cellular network device to a wireless local network in response to a communication device detecting the wireless local network;
enabling provision of a temporary activation key to the communication device in response to receiving an indication from a cellular network device denoting that the communication device is authorized to utilize the service based in part on determining that one or more identifiers of the request are valid;
enabling provision of a private key to the communication device, to enable the communication device to utilize the private key to subsequently register to transfer other communications of the cellular network device to the wireless local network or another wireless local network, in response to receiving a message for the private key from the communication device and receiving a cellular message from the cellular network device, the cellular message was initially received by the cellular network device from the communication device; and utilizing the generated private key to subsequently register the communication device to transfer the other communications of the cellular network device to the wireless local network or the another wireless local network in response to receipt of another request from the communication device, wherein utilizing the private key to register the communication device further comprises determining whether a value received from the communication device in response to a challenge matches a response value determined based in part on calculating a hash of the private key.

2. The method of claim 1, wherein prior to enabling provision of the private key, the method further comprises validating an encrypted portion of the message based in part on using the temporary activation key and the one or more identifiers which are associated with the communication device.

3. The method of claim 2, wherein the encrypted portion comprises a cryptographic hash of one of the identifiers and the temporary activation key, the cryptographic hash being generated by the cellular network device.

4. The method of claim 1, wherein the cellular message comprises a cellular short message service message.

5. The method of claim 1, wherein the message and the cellular message are received concurrently.

6. The method of claim 1, wherein the one or more identifiers comprise at least one of a Mobile Station International Subscriber Directory Number or an International Mobile Subscriber Identity.

7. The method of claim 1, wherein the wireless local network comprises at least one of a Wireless Fidelity access point or a Wireless Local Area Network access point.

8. The method of claim 1, wherein enabling provision of the private key further comprises enabling provision of the private key in an encrypted message.

9. The method of claim 1, wherein the communications comprise at least one of a voice call or a data message.

10. An apparatus comprising at least one processor and at least one memory including computer program code, the at least one memory and the computer program code configured to, with the processor, cause the apparatus to at least:
receive a request to activate a service to enable transfer of communications provided by a cellular network device to a wireless local network in response to a communication device detecting the wireless local network;
enable provision of a temporary activation key to the communication device in response to receiving an indication from a cellular network device denoting that the communication device is authorized to utilize the service based in part on determining that one or more identifiers of the request are valid;
enable provision of a private key to the communication device, to enable the communication device to utilize the private key to subsequently register to transfer other communications of the cellular network device to the wireless local network or another wireless local network, in response to receiving a message for the private key from the communication device and receiving a cellular message from the cellular network device, the cellular message was initially received by the cellular network device from the communication device;
utilize the generated private key to subsequently register the communication device to transfer the other communications of the cellular network device to the wireless local network or the another wireless local network in response to receipt of another request from the communication device; and
utilize the private key to register the communication device by determining whether a value received from the communication device in response to a challenge matches a response value determined based in part on calculating a hash of the private key.

11. The apparatus of claim 10, wherein prior to enable provision of the private key, the memory and computer program code are further configured to, with the processor, cause the apparatus to:
validate an encrypted portion of the message based in part on using the temporary activation key and the one or more identifiers which are associated with the communication device.

12. The apparatus of claim 11, wherein the encrypted portion comprises a cryptographic hash of one of the identifiers and the temporary activation key, the cryptographic hash being generated by the cellular network device.

13. The apparatus of claim 11, wherein the cellular message comprises a cellular short message service message.

14. The apparatus of claim 10, wherein the message and the cellular message are received concurrently.

15. The apparatus of claim 10, wherein the one or more identifiers comprise at least one of a Mobile Station International Subscriber Directory Number or an International Mobile Subscriber Identity.

16. The apparatus of claim 10, wherein the wireless local network comprises at least one of a Wireless Fidelity access point or a Wireless Local Area Network access point.

17. The apparatus of claim 10, wherein the memory and computer program code are further configured to, with the processor, cause the apparatus to:
enable provision by enabling provision of the private key in an encrypted message.

18. The apparatus of claim 10, wherein the communications comprise at least one of a voice call or a data message.

19. The apparatus of claim 10, wherein the apparatus comprises a network device.

20. A computer program product comprising at least one non-transitory computer-readable storage medium having computer-readable program code portions stored therein, the computer-readable program code portions comprising:
program code instructions configured to cause receipt of a request to activate a service to enable transfer of communications provided by a cellular network device to a wireless local network in response to a communication device detecting the wireless local network;
program code instructions configured to enable provision of a temporary activation key to the communication device in response to receiving an indication from a cellular network device denoting that the communication device is authorized to utilize the service based in part on determining that one or more identifiers of the request are valid;
program code instructions configured to enable provision of a private key to the communication device, to enable the communication device to utilize the private key to subsequently register to transfer other communications of the cellular network device to the wireless local network or another wireless local network, in response to receiving a message for the private key from the communication device and receiving a cellular message from the cellular network device, the cellular message was initially received by the cellular network device from the communication device;
program code instructions configured to utilize the generated private key to subsequently register the communication device to transfer the other communications of the cellular network device to the wireless local network or the another wireless local network in response to receipt of another request from the communication device; and program code instructions configured to utilize the private key to register the communication device by determining whether a value received from the communication device in response to a challenge matches a response value determined based in part on calculating a hash of the private key.

21. The computer program product of claim 20, wherein prior to enable provision of the private key, the computer program product further comprises:

program code instructions configured to validate an encrypted portion of the message based in part on using the temporary activation key and the one or more identifiers which are associated with the communication device.

* * * * *